US012348917B2

(12) United States Patent
Kimbell, III et al.

(10) Patent No.: US 12,348,917 B2
(45) Date of Patent: Jul. 1, 2025

(54) SPEAKER SYSTEM WITH EXCHANGEABLE ELECTRONIC UNIT

(71) Applicant: Concierge Audio LLC, Covington, GA (US)

(72) Inventors: Richard Guy Kimbell, III, Covington, GA (US); Jeffrey Charles Kussard, Minneapolis, MN (US)

(73) Assignee: Concierge Audio LLC, Covington, GA (US)

( * ) Notice: Subject to any disclaimer, the term of this patent is extended or adjusted under 35 U.S.C. 154(b) by 252 days.

(21) Appl. No.: 18/312,340

(22) Filed: May 4, 2023

(65) Prior Publication Data

US 2024/0373155 A1 Nov. 7, 2024

(51) Int. Cl.
*H04R 1/02* (2006.01)

(52) U.S. Cl.
CPC ......... *H04R 1/025* (2013.01); *H04R 2420/07* (2013.01); *H04R 2420/09* (2013.01)

(58) Field of Classification Search
CPC .......... H04R 1/02; H04R 1/025; H04R 1/026; H04R 2420/07; H04R 2420/09; H04R 2201/028; A47B 57/58; A47B 57/583; A47B 57/585; A47B 81/062; G11B 33/02; G11B 33/04; G10K 9/22
See application file for complete search history.

(56) References Cited

U.S. PATENT DOCUMENTS

| | | | | |
|---|---|---|---|---|
| 3,680,936 | A * | 8/1972 | Backhaus | A47B 46/00 312/7.1 |
| 4,828,340 | A * | 5/1989 | Jorgensen | A47B 81/062 312/236 |
| 5,956,227 | A | 9/1999 | Kitaoka | |
| 6,490,153 | B1 | 12/2002 | Casebolt et al. | |
| 7,423,870 | B2 | 9/2008 | Carlisi et al. | |
| 7,719,837 | B2 | 5/2010 | Wu et al. | |
| 8,427,828 | B2 | 4/2013 | Kehret et al. | |
| 10,709,032 | B1 * | 7/2020 | Holyoake | H05K 7/1489 |
| 2012/0213382 | A1 * | 8/2012 | Tracy | H04R 1/025 381/77 |
| 2017/0055701 | A1 * | 3/2017 | Latvis, Jr. | A47B 91/024 |

FOREIGN PATENT DOCUMENTS

| | | |
|---|---|---|
| EP | 0912081 A2 | 4/1999 |

* cited by examiner

*Primary Examiner* — Jason R Kurr
(74) *Attorney, Agent, or Firm* — Briggs Intellectual Property Law; Jeremy A. Briggs

(57) ABSTRACT

An audio output device is disclosed. The audio output device may be a speaker system. The system may include a cabinet and a spring roller disposed at a cabinet bottom surface facing away from a cabinet top surface. The cabinet may house a speaker. The system may further include a base plate attached to cabinet side surfaces such that the base plate may be parallel to the cabinet bottom surface. The system may further include an exchangeable electronic unit that may removably slide and insert between the cabinet bottom surface and a base plate top surface. The spring roller may apply a downward force on the electronic unit when the electronic unit may be inserted between the cabinet bottom surface and the base plate top surface.

20 Claims, 8 Drawing Sheets

SPEAKER SYSTEM WITH EXCHANGEABLE ELECTRONIC UNIT

TECHNICAL FIELD

The present disclosure relates to a speaker system, and more specifically to a speaker system with an exchangeable electronic unit.

BACKGROUND

Modern audio output devices such as speaker systems include electronic units that are integrated with the audio output devices. An electronic unit may include a power socket, one or more wireless transceivers/chips, a display panel, a user interface, and/or the like. With rapidly advancing technology, such electronic units typically get obsolete within a few months or years. Since a conventional speaker system may have an integrated electronic unit, if a user desires to upgrade an old electronic unit with a new electronic unit, the user may be required to replace the entire speaker system with a new speaker system. Frequently replacing and purchasing new speaker systems, especially expensive speaker systems, may cause inconvenience to users and may not be financially viable.

Further, if the electronic unit develops fault, the user may be required to send the entire speaker system to a service professional for repair. During the time duration the electronic unit may be getting repaired, the user may not be able to use the speaker system. This may cause further inconvenience to the user, especially if the service professional takes days or weeks to get the electronic unit repaired.

Thus, there is a need for a system that enables users to conveniently upgrade or replace an electronic unit of an audio output device such as a speaker system.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
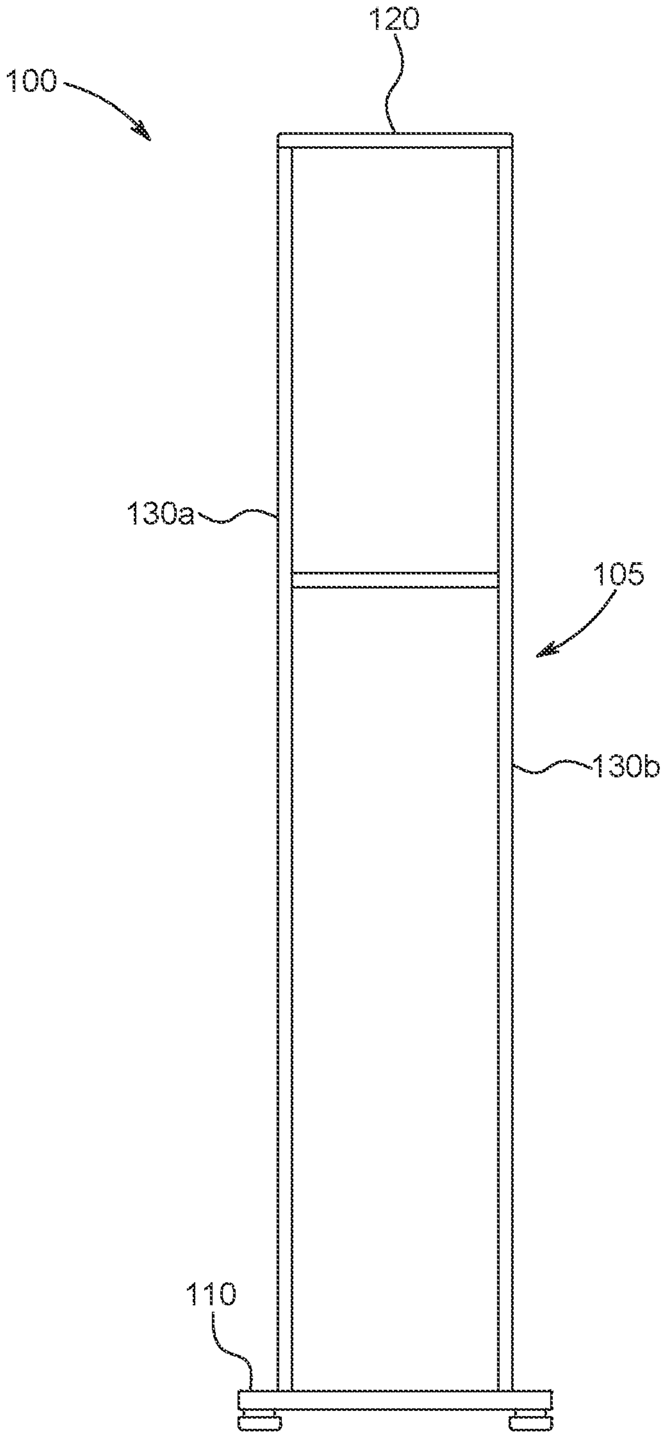
FIG. 1A depicts a front view of an example audio output device in accordance with the present disclosure.

The present disclosure is directed towards an audio output device, for example, a speaker system. The speaker system may include a cabinet, an electronic unit and a base plate. The cabinet may house one or more system components, e.g., a speaker, an amplifier, etc. The electronic unit may enable a user to power the system components and/or wirelessly control system component operation. The electronic unit may be disposed between a cabinet bottom surface and the base plate (specifically, a base plate top surface). The electronic unit may be replaceable or exchangeable. Specifically, the user may replace an old or a faulty electronic unit with a new electronic unit by "sliding out" the old electronic unit from the speaker system and sliding/inserting the new electronic unit between the cabinet bottom surface and the base plate top surface.

The system may further include one or more spring roller bearings that may be disposed at the cabinet bottom surface. The spring roller bearings may enable the user to conveniently slide the electronic unit between the cabinet bottom surface and the base plate top surface. The spring roller bearings may further apply a "downward force" on an electronic unit top surface such that the electronic unit may securely and tightly press against the base plate top surface.

In some aspects, the base plate may be made of a thermal conductive material, e.g., aluminum, which may enable the base plate to dissipate heat generated by the electronic unit to ambient environment. By applying the downward force on the electronic unit, the spring roller bearings may ensure that no or minimal air gap may be present between an electronic unit bottom surface and the base plate top surface, thereby enabling efficient heat dissipation from the base plate.

In further aspects, the electronic unit top surface may include passages on which the spring roller bearings may slide, which may enable the user to conveniently insert the electronic unit between the cabinet bottom surface and the base plate top surface. Furthermore, the base plate top surface may include channels and the electronic unit bottom surface may include posts that may mate together when the user slides the electronic unit into the speaker system, thus enhancing user convenience of sliding the electronic unit.

The present disclosure discloses a speaker system that enables the user to conveniently replace an old or a faulty electronic unit with a new electronic unit. The user may not be required to plug or unplug any wires or connectors to replace an old electronic unit, thus enhancing user convenience of exchanging electronic units. The system may include a thermal conductive base plate that may dissipate heat generated by the electronic unit, thus enabling efficient system operation. Further, the system includes spring roller bearings that enable the user to conveniently slide in/out an electronic unit into/from the speaker system, and ensure that no or minimal air gap exists between the electronic unit and the base plate. These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1A depicts a front view of an example audio output device 100 in accordance with the present disclosure. While describing FIG. 1A, references may be made to FIG. 1B that depicts a back view of the audio output device 100. The audio output device 100 may be, for example, a speaker system. Hereinafter, the audio output device 100 is referred to as the speaker system 100.

The speaker system 100 may include a cabinet 105, a base plate 110 and an electronic unit 115. The cabinet 105 may be hollow and may be of any shape including, but not limited to, a cube, a cuboid (as shown), a triangular prism, a pentagonal prism, a hexagonal prism, etc. Cabinet walls may be made of any material including, but not limited to, wood, fiber, plastic, metal, and/or the like. Cabinet interior portion (not shown) may be configured to house one or more components or units including, but not limited to, a speaker, an amplifier, vibration dampeners, and/or the like.

Figure 1B:
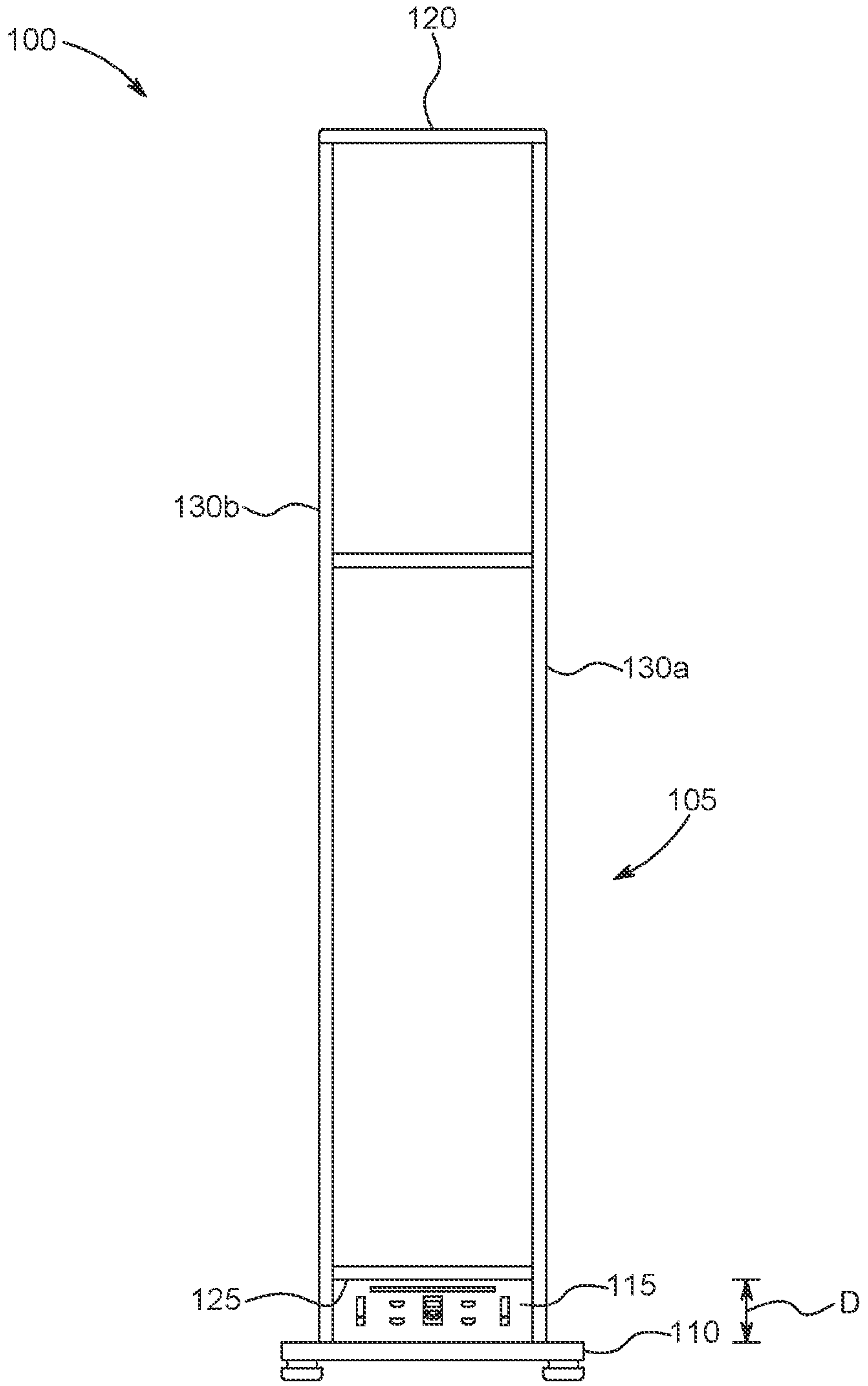
FIG. 1B depicts a back view of the audio output device of FIG. 1A in accordance with the present disclosure.

The cabinet 105 may include a cabinet top surface 120, a cabinet bottom surface 125 and cabinet side surfaces 130*a*, 130*b* (collectively referred to as cabinet side surfaces 130). In some aspects, the cabinet side surfaces 130 may extend beyond or below the cabinet bottom surface 125 by a predefined distance "D", as shown in FIG. 1B. Stated another way, a cabinet side surface length may be greater than a distance between the cabinet top surface 120 and the cabinet bottom surface 125.

The base plate 110 may be attached to bottom edges of the cabinet side surfaces 130 such that a base plate top surface (shown as base plate top surface 225 in FIG. 2) may be disposed at the predefined distance "D" from the cabinet bottom surface 125. The base plate 110 may have a shape complementary to a cabinet bottom surface shape. In an exemplary aspect, the base plate 110 may be rectangular or square in shape. Further, as shown in FIG. 1B, the base plate 110 may be disposed parallel to the cabinet bottom surface 125. In some aspects, the base plate 110 may be made of a thermal conductive material (e.g., aluminum, copper, etc.), and may be configured to transfer or dissipate heat to ambient environment that may be generated by the electronic unit 115.

The electronic unit 115 may be an "electronics package" including, but not limited to, a power connector socket, a wireless receiver/chip, a wireless antenna, an Ethernet connector, a user interface, and/or the like. The electronics unit 115 may be used to power the speaker, the amplifier and other components that may be housed in the cabinet 105. The electronic unit 115 may further enable a user (not shown) to wirelessly connect one or more user devices with the speaker system 100 and control speaker system operation via the user devices.

The electronic unit 115 may be removably attached to the speaker system 100 between the cabinet bottom surface 125 and the base plate top surface. The electronic unit 115 may have a height equivalent to the distance "D", such that the electronic unit 115 may securely fit in the gap between the cabinet bottom surface 125 and the base plate top surface. Further, an electronic unit length may be equivalent to (or less than) a cabinet bottom surface length and/or base plate top surface length. Furthermore, an electronic unit width may be equivalent to a width of the gap between the cabinet bottom surface 125 and the base plate top surface. In some aspects, electronic unit walls (e.g., electrical unit top surface wall, bottom surface wall, side walls, front and back surface walls) may be made of metal, e.g., aluminum, which may enable the electronic unit 115 to efficiently dissipate heat through the electronic unit walls.

The electronic unit 115 may be replaceable or exchangeable. For example, the user may replace an old/faulty electronic unit with a new electronic unit (e.g., the electronic unit 115) when the old electronic unit may get obsolete or may develop fault. To replace the old electronic unit, the user may "slide out" (or remove) the old electronic unit from the gap between the cabinet bottom surface 125 and the base plate top surface, and "slide in"/insert the new electronic unit between the gap. The user may not be required to plug or unplug any wires or electronic connectors when the user may be replacing the electronic units. In this manner, the speaker system 100 facilities the user to conveniently replace electronic units without requiring professional assistance.

Figure 2:
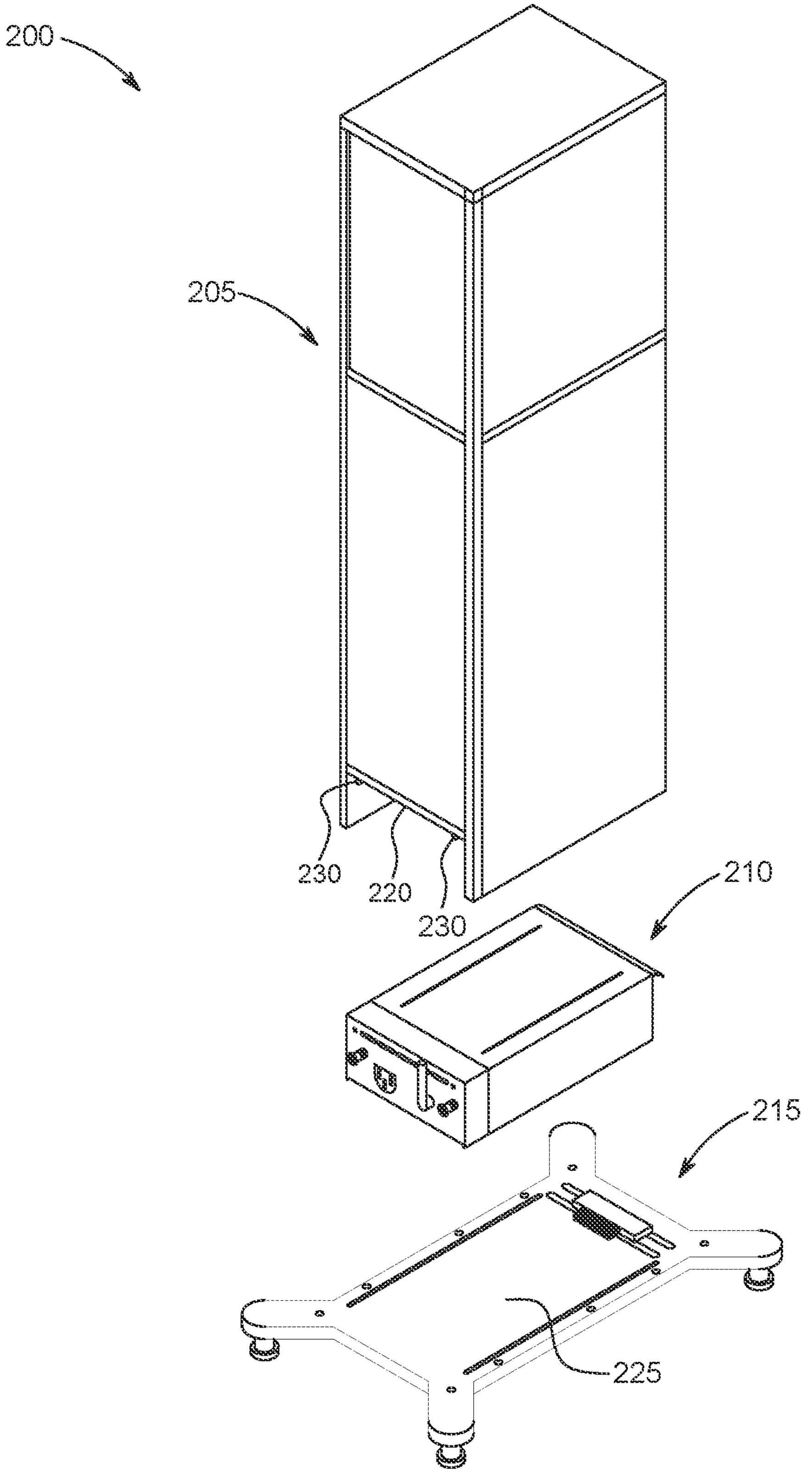
FIG. 2 depicts an exploded view of an example audio output device in accordance with the present disclosure.

FIG. 2 depicts an exploded view of an example audio output device 200 in accordance with the present disclosure. The audio output device 200 may be same as the speaker system 100. Hereinafter, the audio output device 200 is referred to as speaker system 200. While describing FIG. 2, references may be made to FIGS. 3-7.

Figure 4:
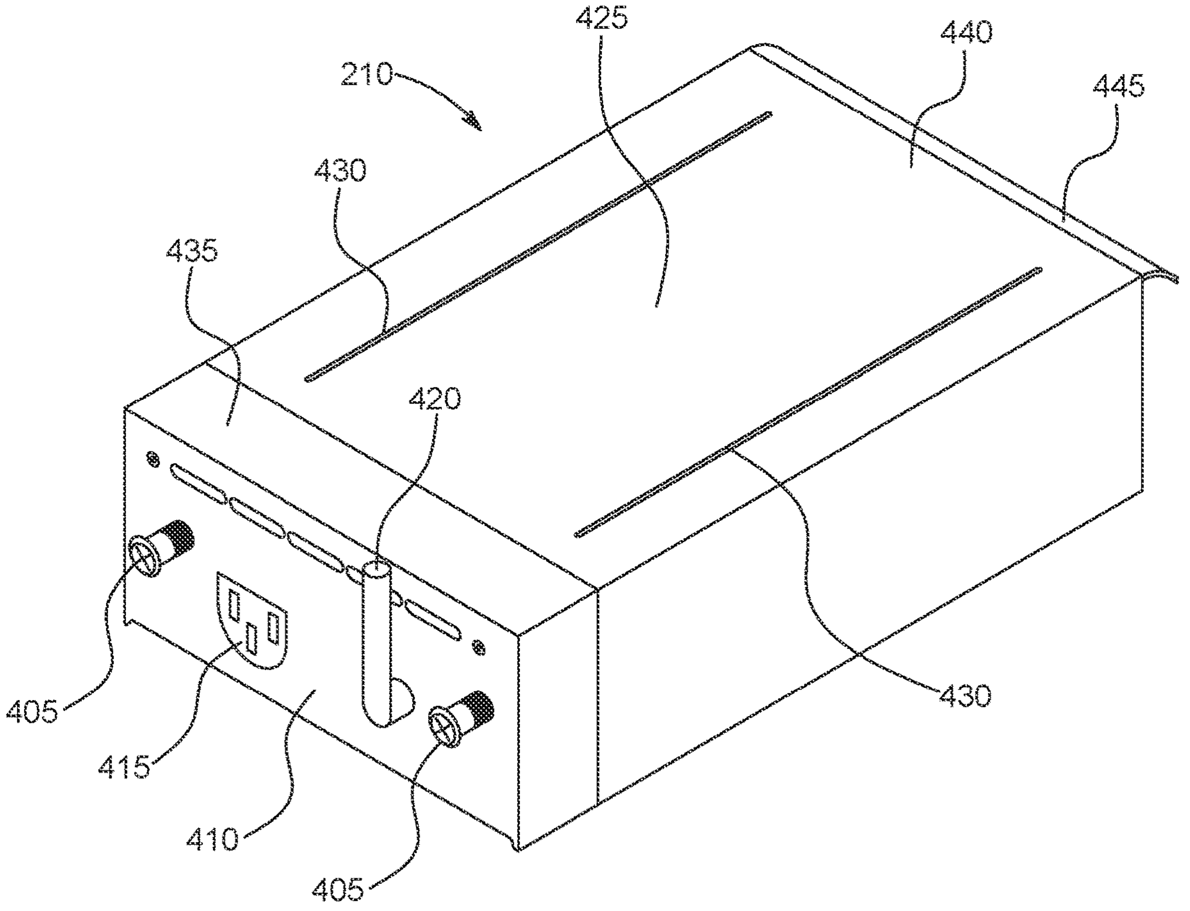
FIG. 4 depicts a front isometric view of an example electronic unit in accordance with the present disclosure.

As described above, the speaker system 200 may include a cabinet 205, an electronic unit 210 and a base plate 215. The cabinet 202 may be same as the cabinet 105, the electronic unit 210 may be same as the electronic unit 115, and the base plate 215 may be same as the base plate 110. The cabinet 205 may include a cabinet bottom surface 220 and the base plate 215 may include a base plate top surface 225. The user may slide and insert the electronics unit 210 between the cabinet bottom surface 220 and the base plate top surface 225 to secure the electronics unit 210 in the speaker system 200. For example, when the user desires to attach the electronic unit 210 in the speaker system 200 (e.g., while replacing an old electronic unit with the electronic unit 210), the user may remove the old electronic unit by "sliding out" the old electronic unit from the speaker system 200, and "sliding in" and inserting the electronic unit 210 between the cabinet bottom surface 220 and the base plate top surface 225. The user may fasten the electronic unit 210 in the speaker system 200 by using fasteners (e.g., screws) that may be disposed at an electronic unit front surface. Example fasteners 405 disposed at an electronic unit front surface 410 is shown in FIG. 4. As shown in FIG. 4, the electronic unit front surface 410 may include additional components/units including, but not limited to, a power connector socket 415, an antenna 420, an Ethernet connector (not shown), and/or the like.

Figure 3:
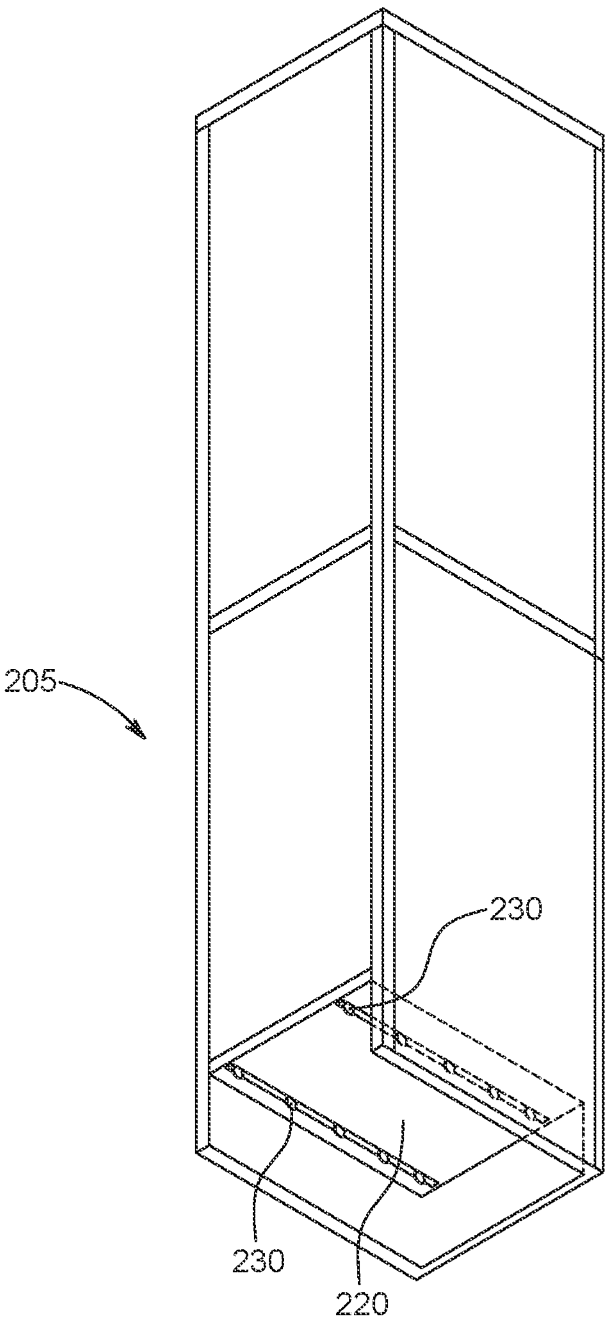
FIG. 3 depicts an isometric view of a cabinet in accordance with the present disclosure.

In some aspects, the cabinet bottom surface 220 may include one or more spring roller bearings 230 (or rollers 230) that may be disposed away from the cabinet top surface 120. The rollers 230 may be configured to be moved "upwards" towards the cabinet bottom surface 220 when an upward force may be applied on the roller 230. In an exemplary aspect, the rollers 230 may be disposed along an entire length of the cabinet bottom surface 220 and at left and right edges of the cabinet bottom surface 220, as shown in FIG. 3. In other aspects (not shown), the rollers 230 may be disposed on a portion of the length of the cabinet bottom surface 220. In yet another aspect (not shown), the rollers 230 may be disposed at a center portion or any other portion (and not left and right edges) of the cabinet bottom surface 220.

The rollers 230 may enable the user to conveniently slide and insert the electronic unit 210 into the gap between the cabinet bottom surface 220 and the base plate top surface 225. Specifically, the electronic unit 210 may include an electronic unit top surface 425 including passages 430 that may be disposed at right and left edges of the electronic unit top surface 425, as shown in FIG. 4. In some aspects, the passages 430 may be elevated portions (or recessed portions) on the electronic unit top surface 425 on which the rollers 230 may slide, when the user slides the electronic unit 210 into the gap between the cabinet bottom surface 220 and the base plate top surface 225. In other aspects, the passages 430 may not be elevated or recessed portions on the electronic unit top surface 425. The arrangement of the rollers

230 and the passages 430 enables the user to conveniently slide and insert the electronic unit 210 into the speaker system 200.

In some aspects, the passages 430 may be disposed at a portion/location of the electronic unit top surface 425 that may be complementary to the portion/location of the rollers 230 on the cabinet bottom surface 220. For example, if the rollers 230 are disposed at a center portion of the cabinet bottom surface 220, the passages 430 too may be disposed (not shown) at a center portion of the electronic unit top surface 425. Further, a passage length may be equivalent to or less than an electronic unit top surface length.

In additional aspects, when the user inserts the electronic unit 210 into the speaker system 200 (i.e., into the gap between the cabinet bottom surface 220 and the base plate top surface 225), the rollers 230 may apply a "downward force" on the electronic unit 210. Specifically, the rollers 230 may apply a downward force on the electronic unit top surface 425 such that an electronic unit bottom surface 505 (shown in FIG. 5) may tightly press against the base plate top surface 225 so that no (or minimal) air gap may be present between the electronic unit bottom surface 505 and the base plate top surface 225.

As described above in conjunction with FIG. 1, the base plate 215 may be made of a thermal conductive material and may be configured to transfer heat from the electronic unit 210 (when the electronic unit 210 may be operational) to ambient environment. By pressing the electronic unit 210 against the base plate top surface 225, the rollers 230 ensure that heat may be efficiently dissipated or transferred from the electronic unit 210 to the base plate 215, and thus to ambient environment.

Figure 7:
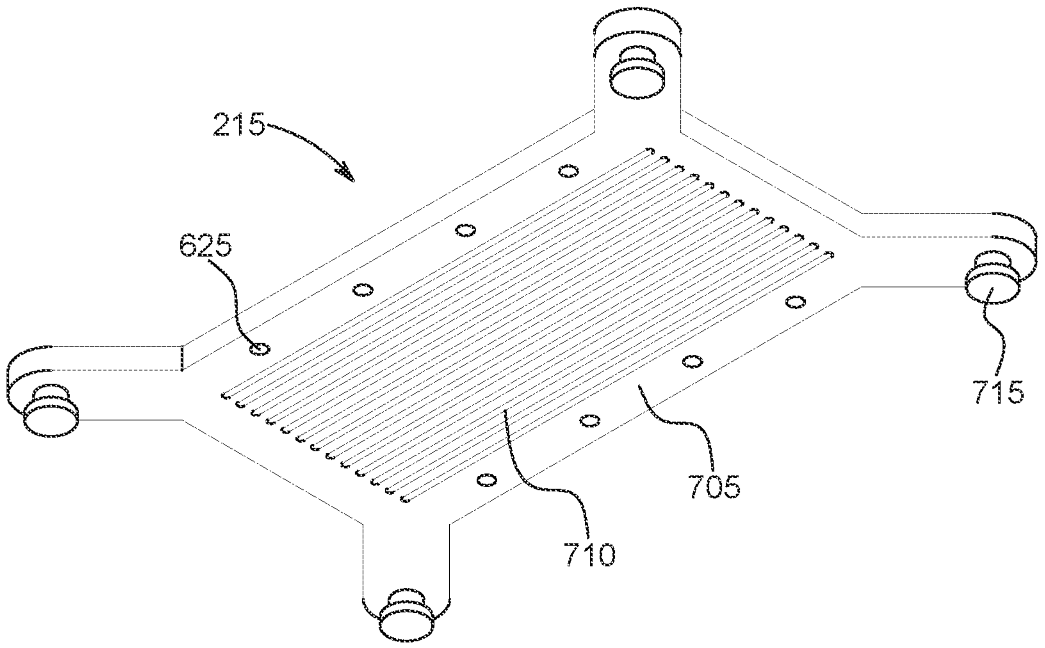
FIG. 7 depicts a bottom isometric view of the base plate of FIG. 6 in accordance with the present disclosure

The base plate 215 may have an optimum thickness that may enable the base plate 215 to efficiently dissipate heat obtained from the electronic unit 210 to ambient environment. In some aspects, the base plate 215 may have a thickness of 0.5 to 2 inches. In a preferred aspect, the base plate 215 may have a thickness of 0.75 inches. Further, as shown in FIG. 7, the base plate 215 may include a base plate bottom surface 705 including a plurality of elongated cavities or trenches 710 that may enable the base plate 215 to efficiently dissipate heat.

Figure 5:
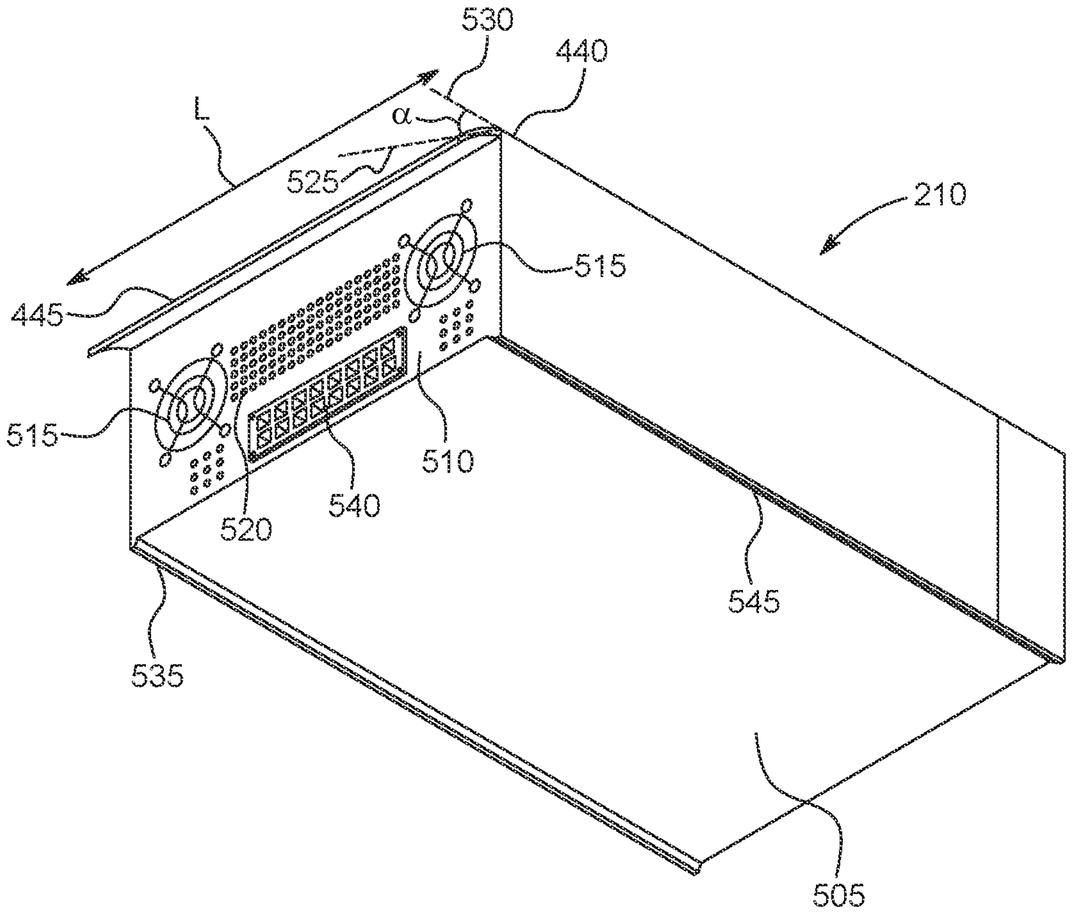
FIG. 5 depicts a back isometric view of the electronic unit of FIG. 4 in accordance with the present disclosure.

In additional aspects, the electronic unit 210 may include an electronic unit back surface 510 (as shown in FIG. 5) that may include one or more fans 515 and one or more vents 520. The fans 515 and the vents 520 may enable the electronic unit 210 to efficiently ventilate air (e.g., transfer hot air from an electronic unit interior portion to outside, and transfer cool air from outside to the electronic unit interior portion).

Speaker system components described above may include one or more additional elements or units that may enable secure attachment between the speaker system components and/or may assist the user in conveniently sliding and inserting the electronic unit 210 into the speaker system 200. For example, the electronic unit 210 may include an electronic unit top proximal end 435 (as shown in FIG. 4) and an electronic unit top distal end 440. While inserting the electronic unit 210 into the gap between the between the cabinet bottom surface 220 and the base plate top surface 225, the user may "push" the electronic unit top proximal end 435 (or unit proximal end 435) or the electronic unit front surface 410 such that the electronic unit top distal end 440 (or unit distal end 440) or the electronic unit back surface 510 may insert into the gap. Stated another way, the user may insert the electronic unit 210 into the gap between the between the cabinet bottom surface 220 and the base plate top surface 225 via the unit distal end 440.

In some aspects, the electronic unit top distal end 440 may include a rail 445 disposed along an electronic unit top distal end length "L" (shown in FIG. 5). As shown in FIG. 5, in some aspects, the rail 445 may be bent or disposed at an angle relative to an electronic unit longitudinal axis. Stated another way, a rail lateral axis 525 may be disposed at a predefined angle "a" relative to an electronic unit longitudinal axis 530. In an exemplary aspect, the angle "a" may be in a range of 30 to 45 degrees. In some aspects, the rail 445 may have a width which may be less than 5% of an electronic unit top surface length. Further, a rail length may be equivalent to the electronic unit top distal end length "L".

In some aspects, the rail 445 may push the rollers 230 "upwards" when the user may be sliding the electronic unit 210 into the gap between the cabinet bottom surface 220 and the base plate top surface 225 via the unit distal end 440. By pushing the rollers 230 upwards, the rail 445 enables the user to conveniently slide the electronic unit 210 into the gap between the cabinet bottom surface 220 and the base plate top surface 225. When the electronic unit 210 may be fully inserted into the gap between the cabinet bottom surface 220 and the base plate top surface 225, the rollers 230 may apply the downforce force on the electronic unit 210, as described above.

In further aspects, the electronic unit bottom surface 505 may include posts 535 (as shown in FIG. 5) that may be disposed at left and right edges of the electronic unit bottom surface 505. The posts 535 may be part of electronic unit side surfaces (as shown in FIG. 5), or may be separately attached to the electronic unit bottom surface 505 via adhesives or fasteners. The posts 535 may be disposed along an entire length of the electronic unit bottom surface 505 or may be disposed at a portion of the length of the electronic unit bottom surface 505. Stated another way, a post length may be same as or different from an electronic unit bottom surface length. Further, a post width may be a fraction (e.g., less than 5%) of an electronic unit side surface width.

Figure 6:
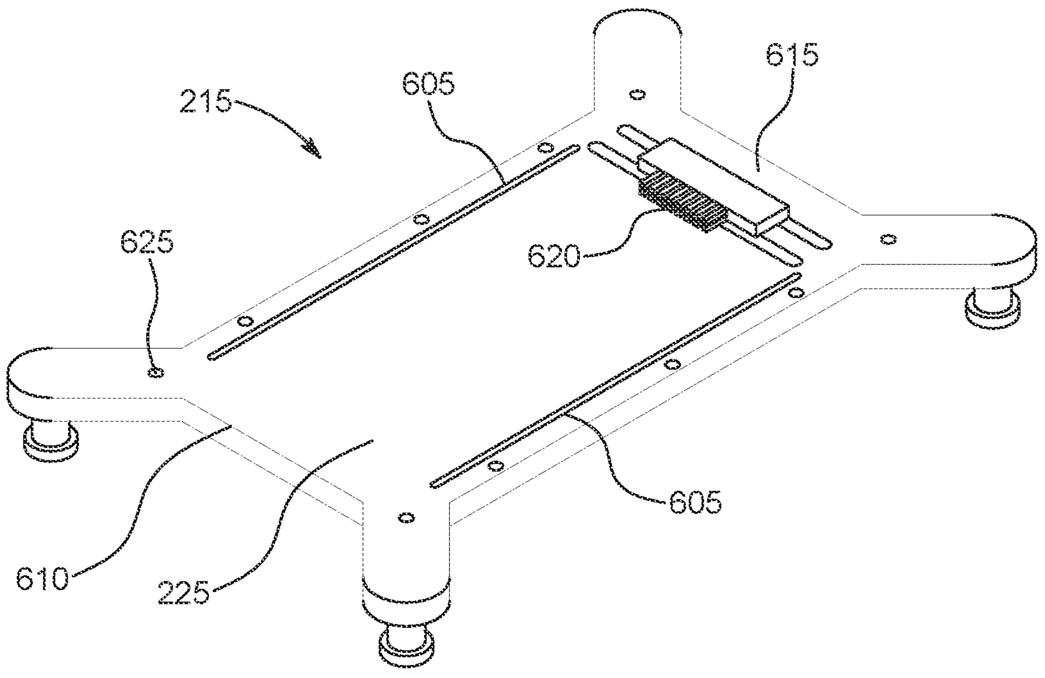
FIG. 6 depicts a top isometric view of an example base plate in accordance with the present disclosure.

The posts 535 may enable the user to conveniently slide the electronic unit 210 into the speaker system 200. Specifically, in this case, the base plate top surface 225 may include channels 605 (as shown in FIG. 6) that may be disposed at portions/locations on the base plate top surface 225 that may be complementary to locations of the posts 535 on the electronic unit bottom surface 505. The channels 605 may be disposed along an entire length of the base plate top surface 225 or may be disposed at a portion (as shown in FIG. 6) of the length of the base plate top surface 225. When the user inserts the electronic unit 210 into the speaker system 200, the posts 535 slide in the channels 605, thus enabling the user to conveniently slide and insert the electronic unit 210 into the gap between the cabinet bottom surface 220 and the base plate top surface 225.

In additional aspects, the electronic unit 210 and the base plate 215 may include male and female connectors that may enable secure attachment between the electronic unit 210 and the base plate 215 when the electronic unit 210 may be fully inserted into the speaker system 200. Specifically, the electronic unit back surface 510 may include an electronic unit connector 540 that may be an electrical female connector (or a male connector). The base plate 215 may include a base plate proximal end 610 and a base plate distal end 615, as shown in FIG. 6. The base plate 215 may further include a base plate connector 620 that may be an electrical male connector (or a female connector) disposed in proximity to the base plate distal end 615.

When the electronic unit 210 may be fully inserted into the speaker system 200, the electronic unit connector 540 may mechanically attach and electrically connect with the base plate connector 620 to enable secure attachment of the electronic unit 210 in the speaker system 200. In this case, the base plate connector 620 may be electrically connected with one or more components (e.g., speaker, amplifier, etc., not shown) that may be housed in the cabinet 105. Thus, by electrically connecting the electronic unit connector 540 (and hence the electronic unit 210) with the base plate connector 620, respective connectors 540, 620 enable the electronic unit 210 to control operations of the components housed in the cabinet 105. For example, when the electronic unit connector 540 may be electrically connected with the base plate connector 620, the user may connect the power connector socket 415 disposed on the electronic unit front surface 410 with a utility power source (not shown) to power the speaker, amplifier, etc. that may be housed in the cabinet 105.

In further aspects, to ensure that the speaker system 200 has a robust and stable structure, the base plate top surface 225 may include one or more fastening means 625 (e.g., through-holes) as shown in FIG. 6, and the base plate bottom surface may include or be attached with one or more legs 715. The fastening means 625 may enable the base plate top surface 225 to securely attach with bottom edges of the cabinet side surfaces 130. Further, the legs 715 may enable the speaker system 200 to be stably placed on a surface (e.g., ground).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An audio output device comprising:

a cabinet having a cabinet top surface, a cabinet bottom surface and cabinet side surfaces;

a spring roller disposed on the cabinet bottom surface facing away from the cabinet top surface;

a base plate attached to the cabinet side surfaces such that the base plate is parallel to the cabinet bottom surface, wherein the base plate comprises a base top surface and a base bottom surface, and wherein the base top surface is disposed at a predefined distance from the cabinet bottom surface; and an electronic unit configured to removably slide and insert between the cabinet bottom surface and the base top surface, wherein the spring roller is configured to apply a downward force on the electronic unit when the electronic unit is inserted between the cabinet bottom surface and the base top surface.

2. The audio output device of claim 1, wherein the electronic unit comprises a unit proximal end and a unit distal end, and wherein the electronic unit is configured to slide and insert between the cabinet bottom surface and the base top surface via the unit distal end.

3. The audio output device of claim 2, wherein the unit distal end comprises a rail disposed along a unit distal end length, and wherein a rail lateral axis is disposed at a predefined angle relative to an electronic unit longitudinal axis.

4. The audio output device of claim 3, wherein the predefined angle is in a range of 30 to 45 degrees.

5. The audio output device of claim 3, wherein the rail is configured to move the spring roller upwards towards the cabinet bottom surface when the electronic unit is slid between the cabinet bottom surface and the base top surface.

6. The audio output device of claim 1, wherein the base plate is made of a thermal conductive material, and wherein the base plate is configured to transfer heat from the electronic unit to ambient environment.

7. The audio output device of claim 1, wherein the base plate further comprises:

a channel disposed on the base top surface along a base plate length;

a base plate proximal end and a base plate distal end; and a base plate connector disposed at the base top surface in proximity to the base plate distal end.

8. The audio output device of claim 7, wherein the electronic unit further comprises:

a post disposed at an electronic unit bottom surface; and an electronic unit front surface and an electronic unit back surface; and an electronic unit connector disposed at the electronic unit back surface.

9. The audio output device of claim 8, wherein the post slides in the channel to enable the electronic unit to slide between the cabinet bottom surface and the base top surface.

10. The audio output device of claim 8, wherein the electronic unit connector attaches with the base plate connector when the electronic unit is inserted between the cabinet bottom surface and the base top surface.

11. The audio output device of claim 8, wherein the base plate connector is a male connector, and the electronic unit connector is a female connector.

12. The audio output device of claim 8, wherein the electronic unit front surface comprises at least one of: a power connector socket, a wireless antenna and an Ethernet connector.

13. The audio output device of claim 1, wherein the audio output device is a speaker system.

14. The audio output device of claim 13, wherein the cabinet is configured to house a speaker.

15. A audio output device comprising:

a cabinet having a cabinet top surface, a cabinet bottom surface and cabinet side surfaces;

a spring roller disposed on the cabinet bottom surface facing away from the cabinet top surface;

a base plate attached to the cabinet side surfaces such that the base plate is parallel to the cabinet bottom surface, wherein the base plate comprises a base top surface and a base bottom surface, and wherein the base top surface is disposed at a predefined distance from the cabinet bottom surface; and an electronic unit configured to removably slide and insert between the cabinet bottom surface and the base top surface, wherein:

the electronic unit comprises a unit proximal end and a unit distal end, the electronic unit is configured to slide and insert between the cabinet bottom surface and the base top surface via the unit distal end, the unit distal end comprises a rail disposed along a unit distal end length, and a rail lateral axis is disposed at a predefined angle relative to an electronic unit longitudinal axis, and wherein the spring roller is configured to apply a downward force on the electronic unit when the electronic unit is inserted between the cabinet bottom surface and the base top surface.

16. The audio output device of claim 15, wherein the rail is configured to move the spring roller upwards when the electronic unit is slid between the cabinet bottom surface and the base top surface.

17. The audio output device of claim 15, wherein the base plate is made of a thermal conductive material, and wherein the base plate is configured to transfer heat from the electronic unit to ambient environment.

18. The audio output device of claim 15, wherein the audio output device is a speaker system.

19. The audio output device of claim 18, wherein the cabinet is configured to house a speaker.

20. A audio output device comprising:

a cabinet having a cabinet top surface, a cabinet bottom surface and cabinet side surfaces;

a spring roller disposed on the cabinet bottom surface facing away from the cabinet top surface;

a base plate attached to the cabinet side surfaces such that the base plate is parallel to the cabinet bottom surface, wherein:

the base plate comprises a base top surface and a base bottom surface, the base top surface is disposed at a predefined distance from the cabinet bottom surface, and the base plate is made of a thermal conductive material; and an electronic unit configured to slide and insert between the cabinet bottom surface and the base top surface, wherein the spring roller is configured to apply a downward force on the electronic unit when the electronic unit is inserted between the cabinet bottom surface and the base top surface.

* * * * *